United States Patent
Abe et al.

(10) Patent No.: US 9,966,620 B2
(45) Date of Patent: May 8, 2018

(54) HYDROGEN GENERATOR AND FUEL CELL SYSTEM

(71) Applicant: Panasonic Intellectual Property Management Co., Ltd., Osaka (JP)

(72) Inventors: Miki Abe, Osaka (JP); Akinori Yukimasa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 293 days.

(21) Appl. No.: 14/924,698

(22) Filed: Oct. 27, 2015

(65) Prior Publication Data

US 2016/0149244 A1 May 26, 2016

(30) Foreign Application Priority Data

Nov. 25, 2014 (JP) ................................ 2014-238068

(51) Int. Cl.
*H01M 8/06* (2016.01)
*B01J 19/24* (2006.01)
(Continued)

(52) U.S. Cl.
CPC ........... *H01M 8/0618* (2013.01); *B01J 19/24* (2013.01); *C01B 3/32* (2013.01); *C01B 3/34* (2013.01); *H01M 8/0675* (2013.01); *B01J 2219/00164* (2013.01); *B01J 2219/24* (2013.01); *C01B 2203/0205* (2013.01);
(Continued)

(58) Field of Classification Search
CPC ..... H01M 8/0675; H01M 8/0618; C01B 3/34; C01B 3/32; B01J 19/24
See application file for complete search history.

(56) References Cited

U.S. PATENT DOCUMENTS

| 2012/0040256 A1 | 2/2012 | Kani et al. |
| 2012/0178006 A1 | 7/2012 | Kani et al. |
| 2013/0143136 A1* | 6/2013 | Ukai .................. H01M 8/0438 429/410 |

FOREIGN PATENT DOCUMENTS

| JP | 2004-187752 | 7/2004 |
| JP | 2012-250876 | 12/2012 |

OTHER PUBLICATIONS

The Extended European Search Report dated May 9, 2016 for the related European Patent Application No. 15192909.8.

* cited by examiner

*Primary Examiner* — Ula C Ruddock
*Assistant Examiner* — Frank A Chernow
(74) *Attorney, Agent, or Firm* — McDermott Will & Emery LLP

(57) ABSTRACT

A hydrogen generator has: a reformer that produces hydrogen-containing gas from raw material gas through reforming; a temperature detector that detects the temperature of the reformer; a hydro-desulfurizer that removes sulfur from the raw material gas through hydrodesulfurization; a recycle flow passage through which recycle gas as a portion of the hydrogen-containing gas is supplied to the hydro-desulfurizer; a raw material gas flow detector that detects the flow rate of the raw material gas, the raw material gas flow detector located somewhere in a flow passage for the raw material gas upstream of a junction of the recycle gas and the raw material gas; and a controller that controls the flow rate of the recycle gas in accordance with the temperature of the reformer, the flow rate of the raw material gas, and the flow rate of the recycle gas.

7 Claims, 5 Drawing Sheets

(51) Int. Cl.
  *C01B 3/32* (2006.01)
  *H01M 8/0612* (2016.01)
  *H01M 8/0662* (2016.01)
  *C01B 3/34* (2006.01)

(52) U.S. Cl.
  CPC .. *C01B 2203/066* (2013.01); *C01B 2203/127* (2013.01); *C01B 2203/148* (2013.01); *C01B 2203/169* (2013.01); *C01B 2203/1619* (2013.01)

HYDROGEN GENERATOR AND FUEL CELL SYSTEM

BACKGROUND

1. Technical Field

The present disclosure relates to a hydrogen generator and a fuel cell system both incorporating a hydro-desulfurizer that removes sulfur from raw material gas through reaction with a portion of a hydrogen-containing gas.

2. Description of the Related Art

A fuel cell system that uses hydrocarbon as raw material gas (raw fuel gas) involves reforming the raw material gas by, for example, using steam in the presence of a reforming catalyst. The raw material gas contains a sulfur compound, which may have been added as an odorant or originate from the starting material from which the gas has been made. The sulfur compound, damaging to the reforming catalyst, needs to be removed from the raw material gas.

An example of a desulfurizer, a piece of equipment that removes sulfur from something, is a hydro-desulfurizer. The operation of a hydro-desulfurizer involves hydrodesulfurization, a process of allowing sulfur to react with hydrogen in the presence of a catalyst (Ni—Mo or Co—Mo) and then making the produced hydrogen sulfide adsorbed onto zinc oxide. To meet this need for hydrogen in hydrodesulfurization, a hydro-desulfurizer has a reformer that produces a fuel gas part of which is supplied to the desulfurizer (e.g., see Japanese Patent Application No. 2002-356308).

The technology described in this patent application, however, has room for improvement in terms of maintaining the efficiency of the hydrogen generator.

SUMMARY

One non-limiting and exemplary embodiment provides a hydrogen generator and a fuel cell system with little decrease in the efficiency of the hydrogen generator.

In one general aspect, the techniques disclosed here feature a fuel cell system. The fuel cell system has a reformer, a temperature detector, a hydro-desulfurizer, a recycle gas passage, a raw material gas flow detector, and a controller. The reformer produces hydrogen-containing gas from raw material gas through reforming. The temperature detector detects the temperature of the reformer. The hydro-desulfurizer removes sulfur from the raw material gas through hydrodesulfurization. The recycle flow passage is a passage through which recycle gas as a portion of the hydrogen-containing gas is supplied to the hydro-desulfurizer. The raw material gas flow detector is located somewhere in a flow passage for the raw material gas upstream of a junction of the recycle gas and the raw material gas and detects the flow rate of the raw material gas. The controller controls the flow rate of the recycle gas in accordance with the temperature of the reformer, the flow rate of the raw material gas, and the flow rate of the recycle gas.

The present disclosure advantageously makes hydrogen generators and fuel cell systems with less decrease in efficiency.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
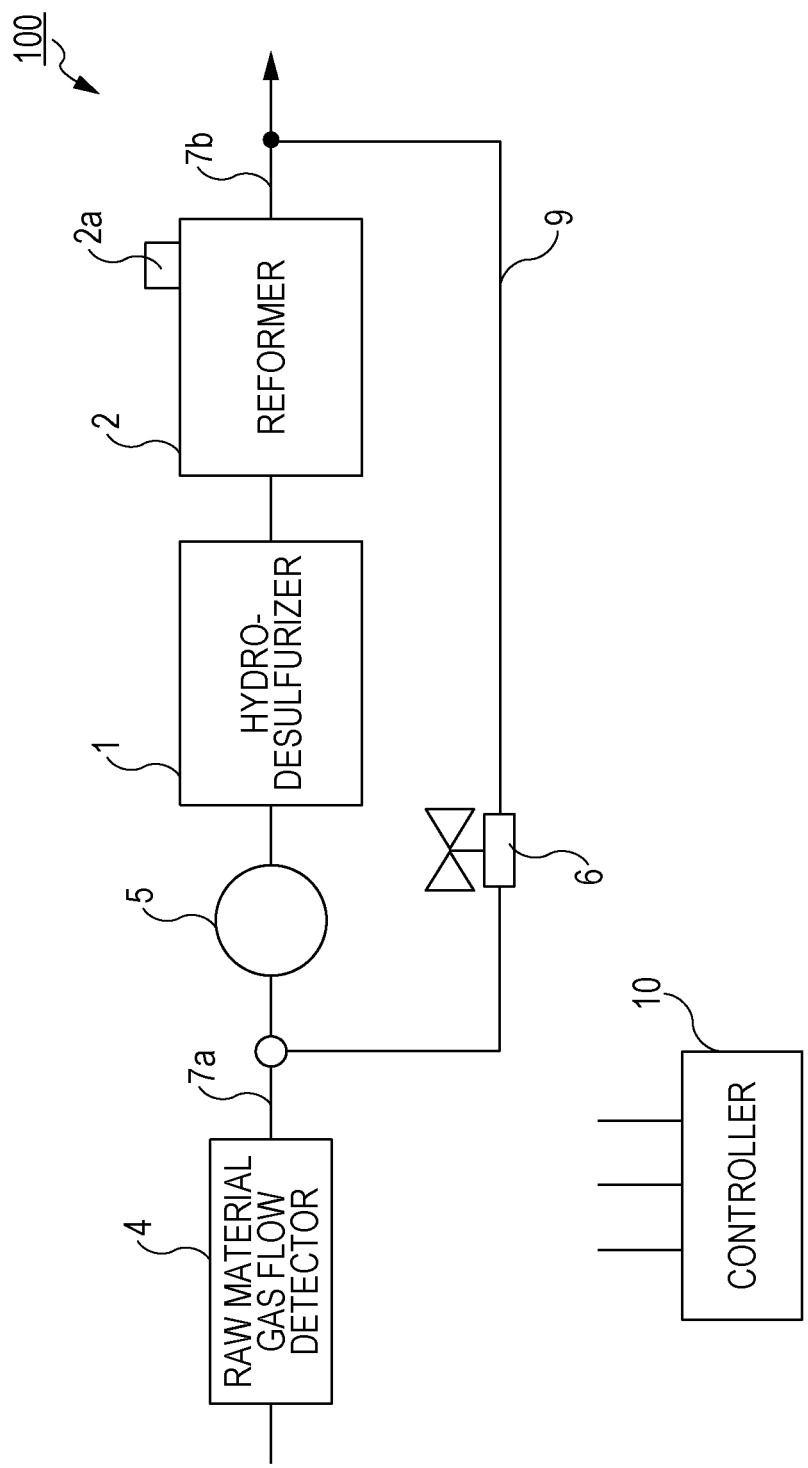
FIG. 1 is a block diagram that schematically illustrates an example of a structure of a hydrogen generator according to Embodiment 1 of the present disclosure.

Underlying Knowledge Forming Basis of the Present Disclosure

The inventors conducted studies on maintaining the efficiency of a hydrogen generator and a fuel cell system. The fuel-reforming system according to the above patent application involves controlling the flow rate of recycle gas to keep the ratio of the flow rate of the raw fuel to that of the recycle gas constant. The hydrogen content of the fuel gas, however, varies with the temperature of the reforming section. This may cause the hydrogen supply to the desulfurizing section to be smaller than required for hydrodesulfurization, resulting in incomplete hydrodesulfurization. The residual sulfur in the raw fuel gas damages the reforming catalyst and affects the efficiency of the hydrogen generator.

In search of a solution to this, the inventors found that it is possible to keep the operation of the hydrogen generator, and therefore a fuel cell system incorporating it, efficient by controlling the flow rate of the recycle gas in accordance with the temperature of the reformer, the flow rate of the raw material gas, and the flow rate of the recycle gas. The present disclosure is based on these findings.

A hydrogen generator according to a first aspect of the present disclosure has a reformer, a temperature detector, a hydro-desulfurizer, a recycle gas passage, a raw material gas flow detector, and a controller. The reformer produces hydrogen-containing gas from raw material gas through reforming. The temperature detector detects the temperature of the reformer. The hydro-desulfurizer removes sulfur from the raw material gas through hydrodesulfurization. The recycle flow passage is a passage through which recycle gas as a portion of the hydrogen-containing gas is supplied to the hydro-desulfurizer. The raw material gas flow detector is located somewhere in a flow passage for the raw material gas upstream of a junction of the recycle gas and the raw material gas and detects the flow rate of the raw material gas. The controller controls the flow rate of the recycle gas in accordance with the temperature of the reformer, the flow rate of the raw material gas, and the flow rate of the recycle gas.

This ensures that even if the hydrogen content of the recycle gas varies due to changes in, for example, the temperature of the reformer, the flow rate of the recycle gas is accordingly controlled, making more reliable the process of removing sulfur from the raw material gas through hydrodesulfurization to keep the hydrogen content of the recycle gas high enough for hydrodesulfurization. This reduces sulfur-related damage to the catalyst and other components, thereby keeping the hydrogen generator efficient.

A hydrogen generator according to a second aspect of the present disclosure is based on the first aspect, and the controller of this hydrogen generator controls the flow rate of the recycle gas to keep the hydrogen content of a raw material after return constant. This makes the process of removing sulfur from the raw material gas through hydrodesulfurization even more reliable, further protecting the efficiency of the hydrogen generator.

A hydrogen generator according to a third aspect of the present disclosure is based on the second aspect, and the controller controls the flow rate of the recycle gas to make the hydrogen content of the recycle gas equal to or lower than a predetermined limit. For example, if a predetermined limit based on the capacity of a flow regulator for the raw material gas is used, the flow rate of the recycle gas is controlled to make the hydrogen content of the recycle gas equal to or lower than this limit. This prevents the flow rate of the raw material gas from exceeding the capacity of the flow regulator for the raw material gas with increasing flow rate of the recycle gas.

A hydrogen generator according to a fourth aspect of the present disclosure is based on any one of the first to third aspects, and this hydrogen generator further has a recycle gas flow detector that detects the flow rate of the recycle gas.

A fuel cell system according to a fifth aspect of the present disclosure has a hydrogen generator and a fuel cell. The hydrogen generator is according to any one of the first to fourth aspects, and the fuel cell produces electricity using hydrogen-containing gas supplied from the hydrogen generator. The reliable removal of sulfur from the raw material gas through hydrodesulfurization reduces sulfur-related damage to the electrodes and other components of the fuel cell, thereby keeping the entire fuel cell system efficient.

A fuel cell system according to a sixth aspect of the present disclosure is based on the fifth aspect, and the fuel cell of this fuel cell system is a solid oxide fuel cell. The reliable removal of sulfur from the raw material gas through hydrodesulfurization keeps a fuel cell system efficient even when the system incorporates a solid oxide fuel cell, which is used with a hydrogen generator having no shift converter.

Embodiment 1

This section describes the structure of a hydrogen generator 100 according to Embodiment 1 with reference to FIG. 1. FIG. 1 is a block diagram that schematically illustrates an example of a structure of the hydrogen generator 100 according to Embodiment 1. The hydrogen generator 100 has a hydro-desulfurizer 1, a reformer 2, a temperature detector 2a, a raw material gas flow detector 4, a raw material gas flow regulator 5, a recycle gas flow regulator 6, a raw material gas flow passage 7a, a hydrogen-containing gas flow passage 7b, a recycle flow passage 9, and a controller 10.

The raw material gas flow passage 7a is a passage through which raw material gas is supplied to the reformer 2. The raw material gas flow passage 7a connects a raw material gas source (not illustrated) and the reformer 2. Examples of the raw material gas source include a cylinder containing the raw material gas or an infrastructure that provides the raw material gas. The raw material gas is supplied from the raw material gas source at a predetermined pressure.

The raw material gas is a gas that contains an organic compound composed of at least carbon and hydrogen, such as methane-based manufactured or natural gases and LPG. The raw material gas contains a sulfur compound, which may have been added as an odorant or originate in the starting material from which the gas has been made. For example, a kind of town gas contains dimethyl sulfide ($C_2H_6S$, DMS) as an odorant. Examples of odorants other than DMS include TBM ($C_4H_{10}S$) and THT ($C_4H_8S$).

The raw material gas flow detector 4 is a sensor that detects the flow rate of the raw material (volume or mass per unit time of the raw material gas) supplied from the raw material gas source. The raw material gas flow detector 4 is located somewhere in the raw material gas flow passage 7a upstream of the junction of recycle gas and the raw material gas.

The raw material gas flow regulator 5 is a piece of equipment that regulates the flow rate of the raw material gas flowing in the raw material gas passage 7a. The raw material gas flow regulator 5 is located somewhere in the raw material gas flow passage 7a downstream of the raw material gas flow detector 4. The raw material gas flow regulator 5 is composed of, for example, a booster and a flow control valve. It is also possible that one of these two is the only component of the raw material gas flow regulator 5. A non-limiting example of the booster is a constant-delivery pump.

The hydro-desulfurizer 1 is a reactor that removes sulfur from the raw material gas through hydrodesulfurization. The hydro-desulfurizer 1 is located somewhere in the raw material gas flow passage 7a downstream of the raw material gas flow regulator 5. The hydro-desulfurizer 1 has a container (not illustrated) loaded with a desulfurizing agent for hydrodesulfurization.

The desulfurizing agent for hydrodesulfurization is composed of, for example, a reaction catalyst and an adsorption catalyst. The reaction catalyst catalyzes hydrodesulfurization, i.e., reaction of the sulfur compound in the raw material gas with hydrogen. Examples include Ni—Mo and Co—Mo catalysts. The adsorption catalyst is somewhere in the flow of the raw material gas downstream of the reaction catalyst. The adsorption catalyst is a sulfur adsorbent that adsorbs hydrogen sulfide resulting from hydrodesulfurization. Examples include ZnO and CuZn catalysts. These types of desulfurizing agents, in which a Ni—Mo or Co—Mo catalyst and a ZnO or CuZn catalyst is used, remove a large amount of sulfur per unit area. Even a small amount of such a desulfurizing agent therefore allows the removal of sulfur to an intended sulfur level.

The temperature suitable for a process of hydrodesulfurization using a CuZn catalyst is in the range of, for example, 10° C. to 40° C., desirably 150° C. to 300° C. CuZn catalysts adsorb sulfur mainly through a physical mechanism at low temperatures, and through a chemical mechanism ($H_2S+ZnO \rightarrow H_2O+ZnS$) at high temperatures. This adsorption process reduces the sulfur content of the raw material gas to, for example, 1 vol. ppb (parts per billion) or less, usually 0.1 vol. ppb or less.

For example, DMS is removed from the raw material gas through a process of hydrodesulfurization represented by the following reaction formulae (1) and (2):

$$C_2H_6S + 2H_2 \rightarrow 2CH_4 + H_2S \tag{1}$$

$$H_2S + ZnO \rightarrow H_2O + ZnS \tag{2}$$

The desulfurizing agent for hydrodesulfurization does not always have to be a combination of a reaction catalyst and an adsorption catalyst. For example, it is possible that a CuZn catalyst is the only component of the desulfurizing agent. CuZn catalysts act in two ways, bringing sulfur compounds into hydrodesulfurization with hydrogen and adsorbing hydrogen sulfide.

The reformer 2 is a reactor that produces hydrogen-containing gas from the raw material gas through reforming. The reformer 2 is connected to the raw material gas flow passage 7a downstream of the hydro-desulfurizer 1 and is also connected to the hydrogen-containing gas flow passage 7b. The reformer 2 has been loaded with a catalyst for reforming (reforming catalyst). Examples of the reforming catalyst include spheres of $Al_2O_3$ (alumina) having their surface impregnated with Ni and spheres of $Al_2O_3$ having their surface attached with ruthenium.

The reforming process can be of any form, such as steam reforming, autothermal reforming, and partial oxidation. Steam reforming is more efficient than the other forms. The reformer 2 has equipment essential for the selected form of reforming. For example, if steam reforming is used, the reformer 2 has a burner (not illustrated) that heats it, an evaporator (not illustrated) that produces steam, and a water supply system (not illustrated) that supplies water to the evaporator. If autothermal reforming is used, the reformer 2 has an air supply system (not illustrated) that supplies air to it.

The temperature detector 2a is a sensor that detects the temperature of the reformer 2. In this embodiment, the reformer 2 is fit with a temperature detector 2a. The structure of the temperature detector 2a is not critical as long as the temperature of the reforming catalyst in the reformer 2 can be directly or indirectly detected. The temperature detector 2a may therefore be located in contact with the reforming catalyst to detect the temperature of the reforming catalyst directly, and it is also possible to place the temperature detector 2a somewhere the temperature correlates with that of the reforming catalyst (e.g., on the surface of or around the reactor of the reformer 2) to detect the temperature of the reforming catalyst indirectly. Examples of the temperature detector 2a include a thermocouple and a thermistor.

The recycle flow passage 9 is a flow passage for mixing a portion of the hydrogen-containing gas (recycle gas) with the raw material gas upstream of the hydro-desulfurizer 1. The upstream end of the recycle flow passage 9 is connected to the hydrogen-containing gas flow passage 7b. The downstream end of the recycle flow passage 9 is connected to the raw material gas flow passage 7a between the raw material gas flow detector 4 and the raw material gas flow regulator 5.

The recycle gas flow regulator 6 is a piece of equipment that regulates the flow rate of the recycle gas flowing in the recycle flow passage 9. The recycle gas flow regulator 6 is located somewhere in the recycle flow passage 9. The structure of the recycle gas flow regulator 6 is not critical as long as the flow rate of the recycle gas can be regulated. Examples of the recycle gas flow regulator 6 include a flow control valve and a pressure control valve.

Besides regulating the flow rate of the recycle gas, the recycle gas flow regulator 6 may serve as a recycle gas flow detector, a piece of equipment that detects the flow rate of the recycle gas. It is also possible that the recycle gas flow regulator 6 is a combination of a regulator and a detector for the flow rate of the recycle gas.

The controller 10 is capable of controlling the flow rate of the recycle gas in accordance with the temperature of the reformer 2, the flow rate of the raw material gas, and the flow rate of the recycle gas. The controller 10 has a processor (not illustrated) and an information storage section (not illustrated). Examples of the processor include an MPU and a CPU. The information storage section stores a control program, examples including a memory. The controller 10 may be a single control section responsible for centralized control or a group of multiple controlling sections that work in concert for decentralized control.

Figure 2:
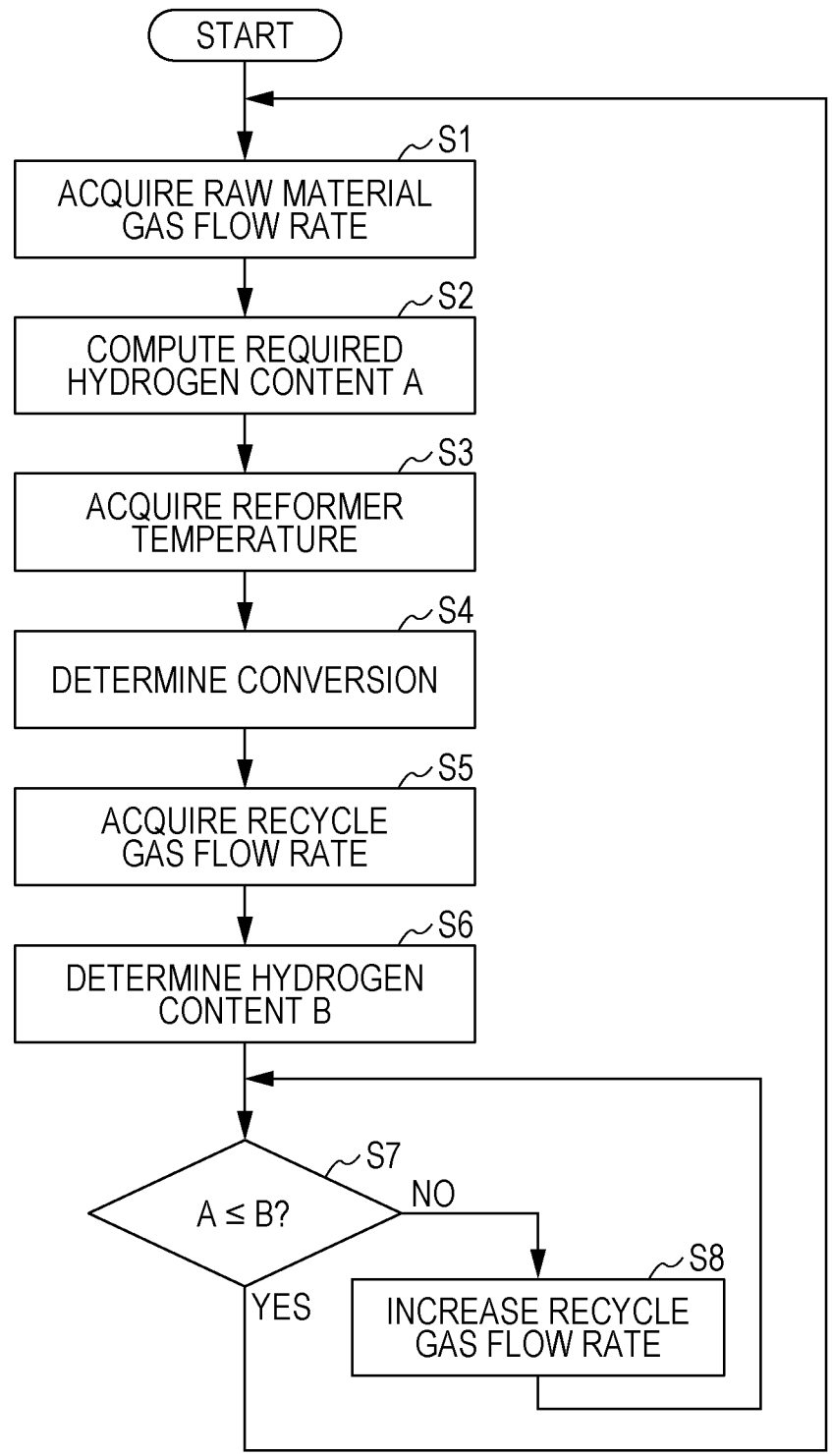
FIG. 2 is a flow diagram that illustrates an example of an operation of the hydrogen generator in FIG. 1.

The following describes an example of how the hydrogen generator 100 operates (the control of the hydrogen generator 100) with reference to FIG. 2. The hydrogen generator 100 operates under control of the controller 10. FIG. 2 is a flow diagram that illustrates an example of an operation of the hydrogen generator 100.

The controller 10 first communicates with the raw material gas flow detector 4 and acquires the flow rate of the raw material gas supplied from the raw material gas source (step S1). The sulfur compound in the raw material gas has been identified and quantified beforehand. The relationship between the flow rate of the raw material gas and the quantity of hydrogen required for hydrodesulfurization (hereinafter referred to as "required hydrogen content A") has therefore already been established in the form of a data table or similar through the use of the quantity and identity of the sulfur compound in the raw material gas and reaction formula (1) above. This relationship is applied to derive the required hydrogen content A from the acquired flow rate of the raw material gas (step S2).

The controller 10 then acquires the temperature of the reformer 2 from the temperature detector 2a (step S3). The conversion of the raw material gas through reforming at the reformer 2 depends on the temperature of the reformer 2. The conversion of the raw material gas is defined as the proportion of the flow rate of the raw material gas used for reforming to that of the raw material gas supplied to the reformer 2 (i.e., the flow rate of the raw material gas detected by the raw material gas flow detector 4). The relationship between the conversion of the raw material gas and the temperature of the reformer 2 has been determined beforehand in the form of, for example, a data table through experiments or similar. This relationship between conversion and temperature is applied to derive the conversion of the raw material gas at the reformer 2 from the temperature of the reformer 2 (step S4).

The controller 10 then acquires the flow rate of the recycle gas from the recycle gas flow regulator 6 (step S5). The recycle gas contains hydrogen resulting from reforming and residual raw material gas after reforming. The conversion of the raw material gas in the reforming process and the flow rate of the recycle gas have already been determined. Likewise, the composition of the raw material gas (e.g., methane ($CH_4$)) and the form of reforming have already been determined. The composition of the raw material gas and the form of reforming decide the proportion of the quantity of hydrogen resulting from reforming to that of the raw material gas used for reforming. These three parameters, i.e., the proportion of the quantity of hydrogen to the quantity of the raw material gas, the conversion of the raw material gas, and the flow rate of the recycle gas, are used to compute the hydrogen content of the recycle gas (hereinafter referred to as "hydrogen content B") (step S6). The relationship among the conversion of the raw material gas, the flow rate of the recycle gas, and the hydrogen content B has been established beforehand.

The controller 10 then compares the required hydrogen content A and the hydrogen content B (step S7). The unit of measurement of the required hydrogen content A and the hydrogen content B is, for example, the mole (mol).

If the hydrogen content B is less than the required hydrogen content A (NO in step S7), then the hydrogen content of the recycle gas is lower than required for hydrodesulfurization. In this case, therefore, the recycle gas flow regulator 6 is controlled to increase the flow rate of the recycle gas. The hydrogen content of the recycle gas rises with increasing flow rate of the recycle gas. As a result, the quantity of hydrogen supplied to the hydro-desulfurizer 1 increases to the level required for hydrodesulfurization.

If the hydrogen content B is equal to or more than the required hydrogen content A (YES in step S7), then the hydrogen content of the recycle gas is high enough for hydrodesulfurization. The process therefore returns to step S1 and repeats steps S1 to S8.

This embodiment involves controlling the flow rate of the recycle gas in accordance with the flow rate of the raw material gas, the temperature of the reformer 2, and the flow rate of the recycle gas and thereby making the hydrogen content of the recycle gas more than required for hydrodesulfurization. As a result, the hydrogen supply to the hydro-desulfurizer 1 is large enough for hydrodesulfurization even if the hydrogen content of the recycle gas varies with changing temperature of the reformer 2. This prevents the sulfur compound from remaining in the raw material gas because of a lack of hydrogen. The damage to the reforming catalyst in the reformer 2 caused by the sulfur compound in the raw material gas is therefore reduced, limiting the decrease in the efficiency of the hydrogen generator 100 associated with damage to the reforming catalyst.

After step S8, the hydrogen content B may be compared with a predetermined limit. This limit is set to be greater than the required hydrogen content A. If the hydrogen content B is more than the predetermined limit, then the hydrogen content of the recycle gas is too much higher than required for hydrodesulfurization. The recycle gas flow regulator 6 is therefore controlled to reduce the flow rate of the recycle gas. This prevents excessive flow of hydrogen into the recycle flow passage 9 in cases such as decreased required hydrogen content A due to a drop in the flow rate of the raw material gas or any other cause. As a result, the hydrogen generator 100 is kept efficient. In this way, the hydrogen content of a raw material after return is kept constant.

Modification of Embodiment 1

Figure 3:
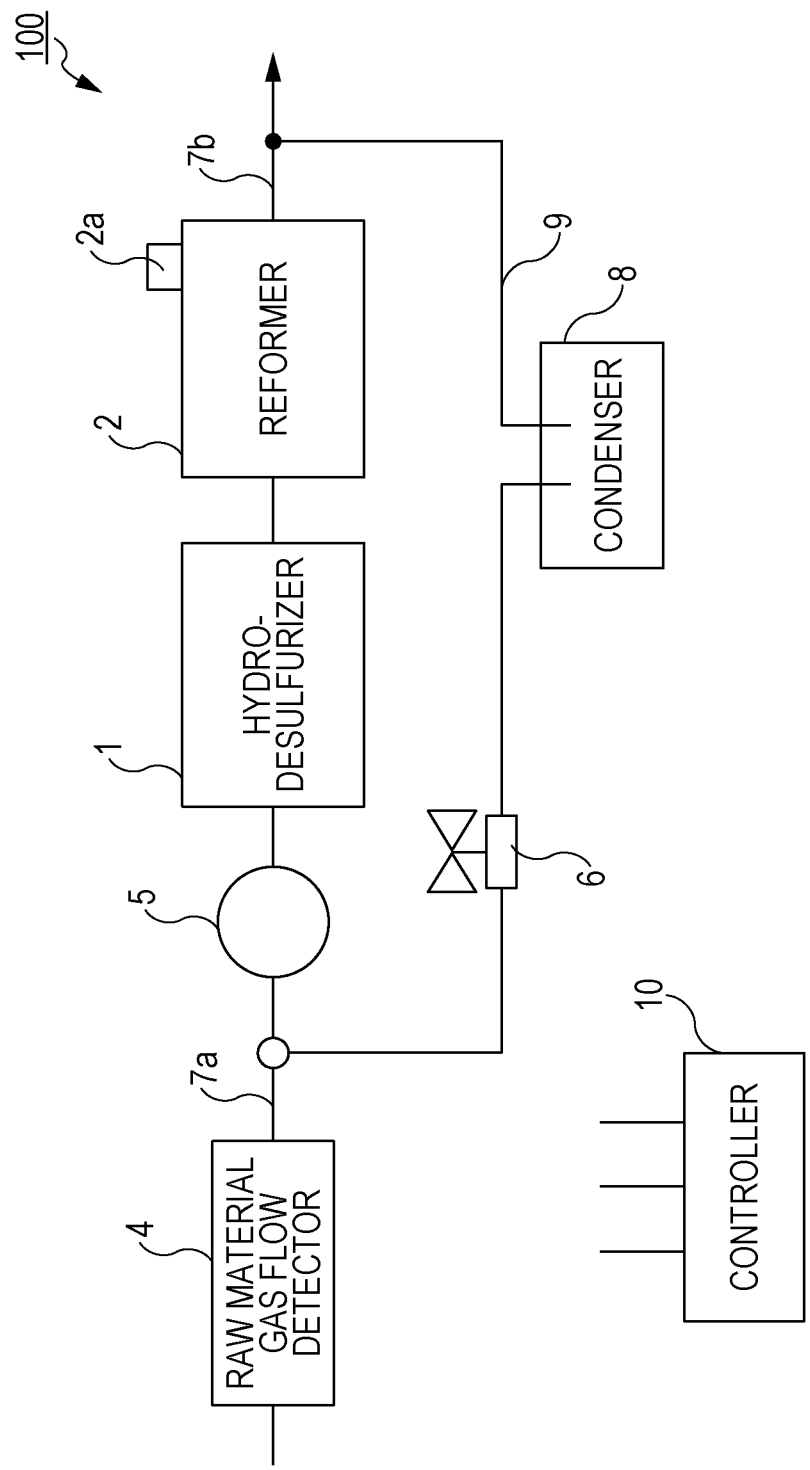
FIG. 3 is a block diagram that schematically illustrates an example of a structure of a hydrogen generator according to a modification of Embodiment 1.

A hydrogen generator 100 according to a modification of Embodiment 1 has a condenser 8 as illustrated in FIG. 3. FIG. 3 is a block diagram that schematically illustrates an example of a structure of the hydrogen generator 100 according to a modification of Embodiment 1.

The condenser 8 is a piece of equipment that removes steam from the recycle gas by making it condense. The condenser 8 is located somewhere in the recycle flow passage 9 upstream of the recycle gas flow regulator 6. The condenser 8 may have a container to collect and store water condensed from steam (condensate). The structure of the condenser 8 may be such that the collected condensate is used for reforming at the reformer 2.

In place of the condenser 8, a container to collect condensate may be installed in the recycle flow passage 9. In this case, the container collects a condensate that forms when steam in the hydrogen-containing gas is cooled while flowing in the recycle flow passage 9. The structure of the container may be such that the collected condensate is used for reforming at the reformer 2.

This modification involves removing steam from the recycle gas using a condenser 8. This keeps the recycle flow passage 9 from being blocked with condensate, thereby preventing a decrease in the hydrogen supply from the recycle gas to the hydro-desulfurizer 1 that would occur upon the blockage of the recycle flow passage 9. Any such decrease in hydrogen supply would cause incomplete removal of the sulfur compound from the raw material gas, and the residual sulfur compound would damage the reforming catalyst in the reformer 2. By preventing this sort of damage, this modification keeps the hydrogen generator 100 efficient.

Embodiment 2

Figure 4:
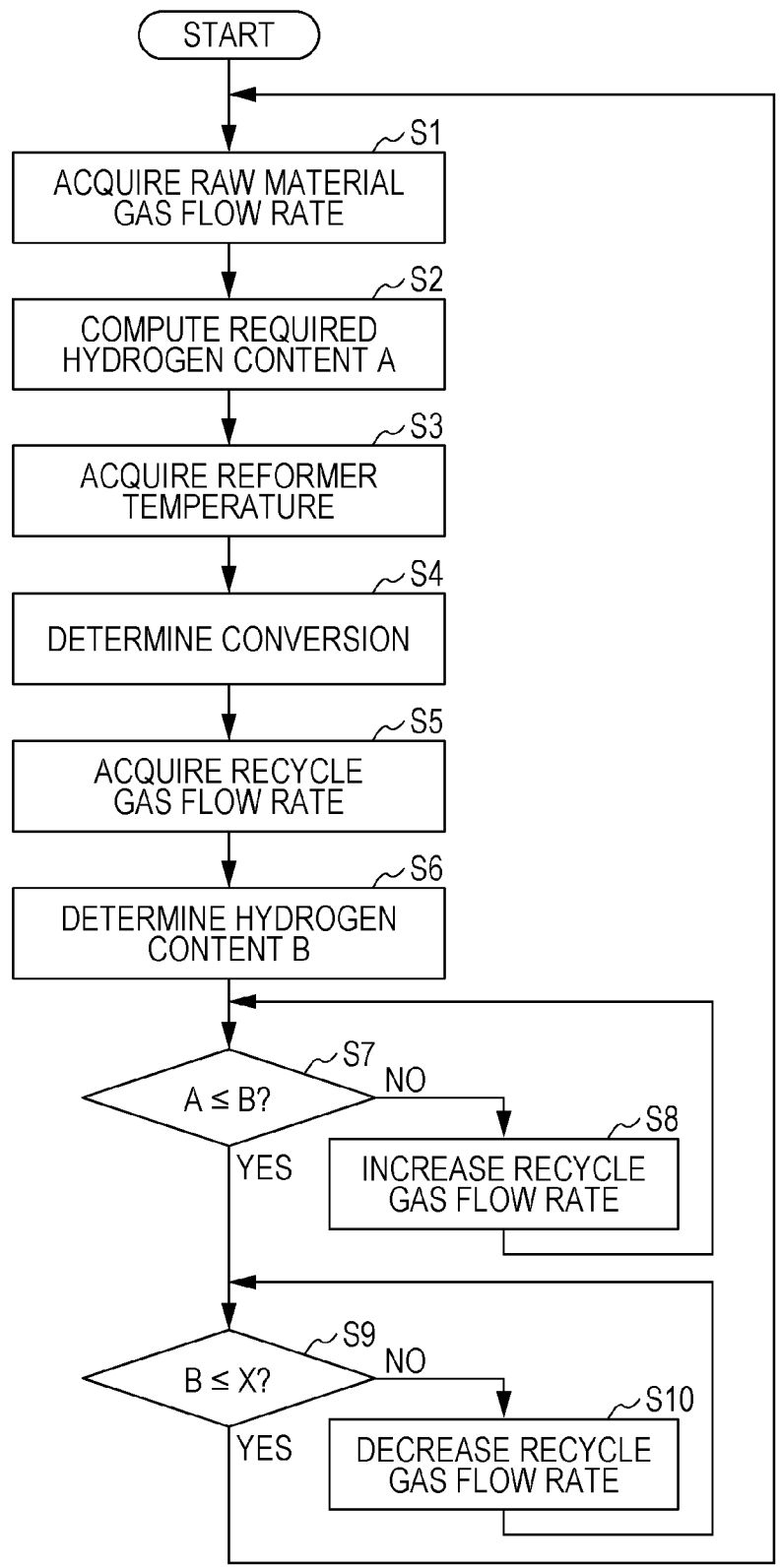
FIG. 4 is a flow diagram that illustrates an example of an operation of a hydrogen generator according to Embodiment 2 of the present disclosure.

A hydrogen generator 100 according to Embodiment 2 executes steps S9 and S10 after step S8 as illustrated in FIG. 4. FIG. 4 is a flow diagram that illustrates an example of an operation of the hydrogen generator 100 according to Embodiment 2.

To be more specific, the process flow in FIG. 4 also follows steps S1 to S8 in FIG. 2. If the hydrogen content B is equal to or more than the required hydrogen content A (YES in step S7), the controller 10 compares the hydrogen content B and a predetermined limit X (step S9). The predetermined limit X can be any value determined on the basis of factors such as the capacity and power consumption of the raw material gas flow regulator 5.

For example, an increase in the flow rate of the recycle gas due to a change in the supply pressure of the raw material gas or any other cause leads to an increase in the flow rate of the gas that the raw material gas flow regulator 5 delivers. This makes the hydrogen content B greater than the predetermined limit X (NO in step S9). In such a case, the raw material gas flow regulator 5 delivers the raw material gas improperly because the quantity of the gas the raw material gas flow regulator 5 needs to deliver is beyond the capacity of the raw material gas flow regulator 5. Furthermore, increasing the flow rate of the recycle gas more than needed will lead to increasing the power consumption of the raw material gas flow regulator 5. The controller 10 therefore controls the recycle gas flow regulator 6 to reduce the flow rate of the recycle gas (step S10).

If the hydrogen content B is equal to or lower than the predetermined limit X (YES in step S9), then the flow rate of the recycle gas is not too much higher than the flow rate based on factors such as the capacity of the raw material gas flow regulator 5. The process therefore returns to step S1 and repeats steps S1 to S10.

This embodiment involves controlling the flow rate of the recycle gas to make the hydrogen content B of the recycle gas equal to or lower than the predetermined limit X. This prevents improper delivery of the raw material gas from the raw material gas flow regulator 5 that would occur if the flow rate of recycle gas increased. An adequate supply of the recycle gas is thus ensured, making more reliable the process of removing sulfur from the raw material gas. The damage to the reforming catalyst in the reformer 2 caused by sulfur in the raw material gas is therefore reduced, limiting the decrease in the efficiency of the hydrogen generator 100 associated with damage to the reforming catalyst. This embodiment also prevents an increase in the power consumption of the raw material gas flow regulator 5 that would occur if the flow rate of the recycle gas increased, further protecting the efficiency of the hydrogen generator 100.

In common with the hydrogen generator 100 in FIG. 1, the hydrogen generator 100 according to Embodiment 2 may be without a condenser 8. Alternatively, the hydrogen generator 100 according to Embodiment 2 may have a condenser 8, like the hydrogen generator 100 in FIG. 3.

Embodiment 3

Figure 5:
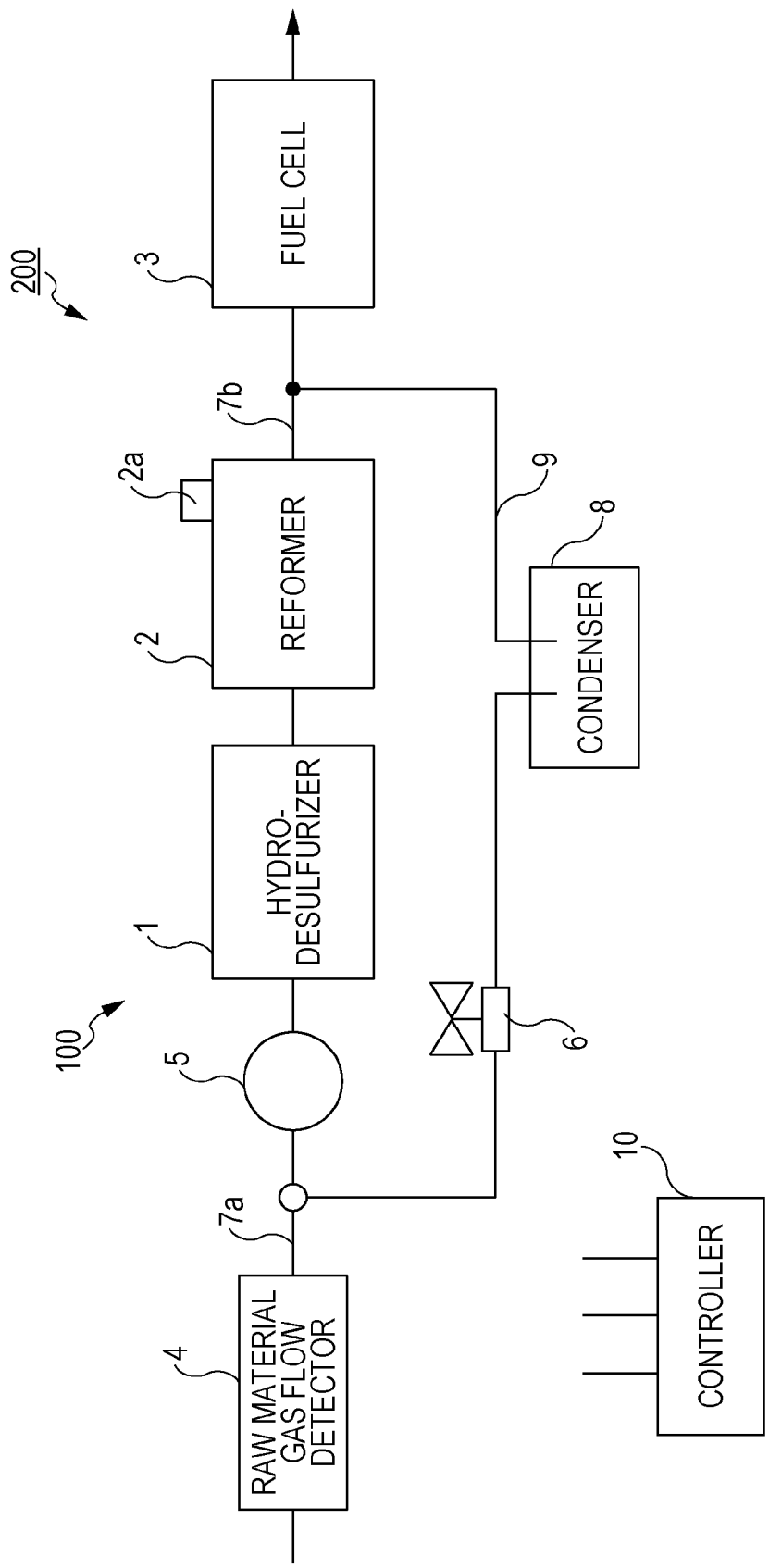
FIG. 5 is a block diagram that schematically illustrates an example of a structure of a fuel cell system according to Embodiment 3 of the present disclosure.

A fuel cell system 200 according to Embodiment 3 has a hydrogen generator 100 and a fuel cell 3 as illustrated in FIG. 5. FIG. 5 is a block diagram that schematically illustrates an example of a structure of the fuel cell system 200 according to Embodiment 3. Although having a condenser 8 in FIG. 5, the hydrogen generator 100 may be without a condenser 8, like the hydrogen generator 100 in FIG. 1. The hydrogen generator 100 operates as illustrated in FIG. 2 or 4.

The fuel cell 3 is a power-generating section that produces electricity using hydrogen-containing gas supplied from the hydrogen generator 100. The fuel cell 3 is connected with the reformer 2 of the hydrogen generator 100 via the hydrogen-containing gas flow passage 7b. The fuel cell 3 can be of any kind, desirably a solid oxide fuel cell (SOFC).

The reason for this is as follows. A fuel cell of any other kind, such as a polymer electrolyte fuel cell (PEFC) or a phosphoric acid fuel cell, has its electrodes damaged by carbon monoxide contained in the hydrogen-containing gas. In this case the hydrogen generator is equipped with a shift converter, a piece of equipment that removes carbon monoxide through shift reaction. The shift reaction produces hydrogen, and the hydro-desulfurizer 1 receives hydrogen produced by the shift converter in addition to hydrogen resulting from reforming. As a result, changes in hydrogen supply due to changes in the temperature of the reformer 2 have little influence on hydrodesulfurization. In contract, a solid oxide fuel cell can use not only hydrogen but also carbon monoxide to produce electricity. In this case the hydrogen generator has no shift converter, and changes in hydrogen supply due to changes in the temperature of the reformer 2 have influence on hydrodesulfurization. Thus, the flow rate of the recycle gas is controlled in accordance with the temperature of the reformer 2 so that the hydrogen supply remains large enough for hydrodesulfurization even when the temperature of the reformer 2 varies. This reduces the damage to the electrodes of the fuel cell 3 and the reforming catalyst in the reformer 2 caused by the sulfur compound in the raw material gas, thereby keeping the fuel cell system 200 efficient.

All of the above embodiments may be combined with each other unless one excludes another.

Numerous modifications and alternative embodiments of the disclosure will be apparent to those skilled in the art in view of the foregoing description. Accordingly, the foregoing description is to be construed as illustrative only, and is provided for the purpose of teaching those skilled in the art the best mode of carrying out the disclosure. The details of the structure and/or function may be varied substantially without departing from the spirit of the disclosure.

Hydrogen generators and fuel cell systems according to the present disclosure are useful as, for example, a hydrogen generator and a fuel cell system with little decrease in the efficiency of the hydrogen generator.

What is claimed is:

1. A hydrogen generator comprising:
a reformer that produces hydrogen-containing gas from raw material gas through reforming;
a temperature detector that detects a temperature of the reformer;
a hydro-desulfurizer that removes sulfur from the raw material gas through hydrodesulfurization;
a recycle flow passage through which recycle gas as a portion of the hydrogen-containing gas is supplied to the hydro-desulfurizer;
a raw material gas flow detector that detects a flow rate of the raw material gas, the raw material gas flow detector located somewhere in a flow passage for the raw material gas upstream of a junction of the recycle gas and the raw material gas; and
a controller including a processor and a memory storing a control program,
wherein the control program, when executed by the processor, causes the controller to control a flow rate of the recycle gas in accordance with the temperature of the reformer, the flow rate of the raw material gas, and the flow rate of the recycle gas.

2. The hydrogen generator according to claim 1, wherein the control program, when executed by the processor, causes the controller to control the flow rate of the recycle gas to keep a hydrogen content of a raw material after return constant.

3. The hydrogen generator according to claim 2, wherein the control program, when executed by the processor, causes the controller to control the flow rate of the recycle gas to make a hydrogen content of the recycle gas equal to or lower than a predetermined limit.

4. The hydrogen generator according to claim 1, further comprising a recycle gas flow detector that detects the flow rate of the recycle gas.

5. A fuel cell system comprising:
a hydrogen generator according to claim 1; and
a fuel cell that produces electricity using hydrogen-containing gas supplied from the hydrogen generator.

6. The fuel cell system according to claim 5, wherein the fuel cell is a solid oxide fuel cell.

7. The hydrogen generator according to claim 1, further comprising a recycle gas flow regulator,
wherein the control program, when executed by the processor, causes the controller to control the flow rate of the recycle gas by controlling the recycle gas flow regulator.

* * * * *